(12) United States Patent
Veariel et al.

(10) Patent No.: US 10,576,675 B2
(45) Date of Patent: Mar. 3, 2020

(54) DEVICES, SYSTEMS, AND PROCESSES FOR PROCESSING POLYMERS

(71) Applicant: ExxonMobil Chemical Patents Inc., Baytown, TX (US)

(72) Inventors: Thomas R. Veariel, San Diego, CA (US); Linjie Zhu, Livingston, NJ (US); Chong Peng, Harrison, NJ (US); Gogos G. Costas, Anna Maria Island, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 273 days.

(21) Appl. No.: 15/518,131

(22) PCT Filed: Oct. 5, 2015

(86) PCT No.: PCT/US2015/053924
§ 371 (c)(1),
(2) Date: Apr. 10, 2017

(87) PCT Pub. No.: WO2016/081077
PCT Pub. Date: May 26, 2016

(65) Prior Publication Data
US 2017/0305058 A1      Oct. 26, 2017

Related U.S. Application Data

(60) Provisional application No. 62/081,921, filed on Nov. 19, 2014.

(30) Foreign Application Priority Data

Jan. 14, 2015   (EP) ...................................... 15151053

(51) Int. Cl.
*B29C 48/691* (2019.01)
*B29C 48/375* (2019.01)
(Continued)

(52) U.S. Cl.
CPC ............ *B29C 48/691* (2019.02); *B29C 48/08* (2019.02); *B29C 48/10* (2019.02); *B29C 48/21* (2019.02); *B29C 48/362* (2019.02); *B29C 48/37* (2019.02); *B29C 48/40* (2019.02); *B29C 48/694* (2019.02); *B29C 48/695* (2019.02); *B29C 48/913* (2019.02); *B29B 9/06* (2013.01); *B29C 48/0022* (2019.02); *B29C 48/022* (2019.02); *B29C 48/04* (2019.02); *B29C 48/05* (2019.02);
(Continued)

(58) Field of Classification Search
None
See application file for complete search history.

(56) References Cited

U.S. PATENT DOCUMENTS 3,486,192 A    12/1969  Le Roy
3,856,442 A    12/1974  Gallagher et al.
(Continued)

FOREIGN PATENT DOCUMENTS

DE    2934147 A    8/1979
EP    0093449 A    11/1983
(Continued)

*Primary Examiner* — Jacob T Minskey
*Assistant Examiner* — Baileigh Kate Darnell

(57) ABSTRACT

Embodiments of an invention disclosed herein relate to devices, processes, and systems for processing polymers.

25 Claims, 2 Drawing Sheets

(51) Int. Cl.
  *B29C 48/30*     (2019.01)
  *B29C 48/08*     (2019.01)
  *B29C 48/10*     (2019.01)
  *B29C 48/21*     (2019.01)
  *B29C 48/37*     (2019.01)
  *B29C 48/40*     (2019.01)
  *B29C 48/88*     (2019.01)
  *B29C 48/695*    (2019.01)
  *B29C 48/36*     (2019.01)
  *B29C 48/694*    (2019.01)
  *B29C 48/00*     (2019.01)
  *B29C 48/625*    (2019.01)
  *B29B 9/06*      (2006.01)
  *B29C 48/05*     (2019.01)
  *B29C 48/04*     (2019.01)
  *B29C 48/345*    (2019.01)

(52) U.S. Cl.
  CPC ............ *B29C 48/30* (2019.02); *B29C 48/345* (2019.02); *B29C 48/387* (2019.02); *B29C 48/625* (2019.02)

(56)             References Cited

U.S. PATENT DOCUMENTS

| | | |
|---|---|---|
| 4,425,044 A | 1/1984 | Kurtz et al. |
| 4,453,905 A | 6/1984 | Bennett |
| 5,728,335 A | 3/1998 | Neubauer |
| 5,730,885 A | 3/1998 | Blakeslee et al. |
| 6,254,712 B1 * | 7/2001 | Enlow ............ B05D 1/265 |
| | | 156/244.11 |
| 6,485,662 B1 | 11/2002 | Neubauer et al. |
| 6,503,431 B1 * | 1/2003 | Kasai ............ B32B 37/153 |
| | | 264/171.13 |
| 7,393,916 B2 | 7/2008 | Neubauer et al. |
| 8,557,154 B2 | 10/2013 | Isaki et al. |
| 2003/0128623 A1 | 7/2003 | Leveque |
| 2004/0209057 A1 * | 10/2004 | Enlow ............ B05D 1/265 |
| | | 428/220 |
| 2005/0035051 A1 | 2/2005 | Kelly et al. |
| 2010/0022735 A1 | 1/2010 | Kanamori |
| 2013/0020247 A1 | 1/2013 | Samann |
| 2013/0176810 A1 | 7/2013 | Kuroda et al. |
| 2013/0181364 A1 | 7/2013 | Rasmussen |
| 2017/0120499 A1 * | 5/2017 | Li ............ B29C 48/40 |

FOREIGN PATENT DOCUMENTS

| | | |
|---|---|---|
| EP | 0816047 | 1/1998 |
| GB | 1386143 | 3/1975 |
| WO | 2013/137953 | 9/2013 |

* cited by examiner

DEVICES, SYSTEMS, AND PROCESSES FOR PROCESSING POLYMERS

CROSS-REFERENCE TO RELATED APPLICATION

This application is a National Stage Application of International Application No. PCT/US2015/053924, filed Oct. 5, 2015, and claims priority to and the benefit of U.S. Provisional Application Ser. No. 62/081,921, filed Nov. 19, 2014, and EP Application No. 15151053.4, filed Jan. 14, 2015, the disclosures of which are hereby incorporated by reference in their entireties.

FIELD OF THE INVENTION

The disclosure relates to devices, systems and processes for processing polymers. In particular, the disclosure relates to devices that are capable of removing undesirable characteristics or imparting desirable characteristics to polymers or compositions comprising the same.

BACKGROUND

Granular polyolefin resins produced in polymerization reactors are often compounded with conventional additives, such as ultraviolet stabilizers, antioxidants, antiblock agents, slip agents, processing aids, and other additives well-known in the art. With or without addition of such additives, granular resins are frequently pelletized for ease in handling, processing, and transportation. These processes may be carried out incorporating the use of extruders or mixers characterized by a feeding section where the granular resin is introduced to the extruder or mixer and conveyed through various processing zones in which the resin is fully (or partially) melted and mechanically mixed (typically by action of co- or counter-rotating, intermeshing or non-intermeshing twin screws, single screws, or rotors). The user might use this final form of the product for the secondary fabrication step or may require re-extrusion of the polymer to generate the final fabrication form, such as blown film, injection molded objects, etc. It is common to employ the use of a polymer melt pump (also called gear pump) to more efficiently generate the polymer pressure required to flow through the discharge section of the extrusion which typically includes, but not limited to, a screen changer (where screens are located if desired) and product-forming die plate. It is commercially undesirable to shut down the processing process to periodically change these screen devices as they foul over time so many processing lines utilize an automatic screen changer which provides for a quick exchange of screens (or screening devices) via a sliding plate arrangement. Exemplary processes are disclosed in WO 2013/137, 953; U.S. Patent Application Publication No. 2013/0181364; and U.S. Pat. Nos. 5,728,335, and 8,557,154.

Undesirable characteristics of polyolefin resins which are processed in such extruders or mixers include inclusions generically termed "gels" that are apparent especially in films formed from such resins. In particular, the term "gels" refers to highly localized inclusions in the polymer, especially film made from polyolefins, which are visually distinct from the surrounding polymeric film. They are mostly due to the presence of either high concentrations of unblended polymer, polymer species different in molecular weight than the surrounding polymer matrix, unreacted catalyst and activator, product contaminants, or other types of visually distinct imperfections. The presence of gels generally lowers the value of such films, and in some cases makes the films unmarketable or not fit-for-use in the application. There have been many approaches in the past to solving this problem. One approach is to remove or reduce the size of the gels from the polyolefin material prior to forming the finished product through the use of screens/filters. (See, for example, U.S. Pat. Nos. 5,730,885, 6,485, 662; and U.S. Patent Application Publication No. 2007/0100132, issued as U.S. Pat. No. 7,393,916.)

Historically, polymer processors have inserted screen mesh filters (also called screen packs) into the process stream forcing the polymer to flow through the screen(s) to filter or break up undesired species from the primary polymer stream. The screens, though, can generate significant pressure drop and are limited by what the upstream system's equipment pressure rating can tolerate (or the pressure rating of the screen holder/device itself). Many of these contained species that are desired to be filtered or dispersed into smaller species are very small in nature (typically 400 microns or less) so the screens would need to have extremely small openings to act on these species, thus generating excessive pressure drop as a result. Likewise, the screens are often very thin in profile so the secondary species can potentially elongate, stretch, or deform in shape such that they can penetrate the screen device and re-emerge on the downstream side of the screen still intact.

Others have approached the problem using gel size reduction devices. For example, U.S. Patent Application Publication No. 2013/0176810 discloses, among other things, a gel size reduction device, comprising: a gel reduction mechanism provided in a polymer flow duct in which a polymer kneaded compound flows and adapted to reduce gel present in the polymer kneaded compound, the gel reduction mechanism includes at least one or more squeezing flow paths having a flow path cross-sectional area smaller than the polymer flow duct, and a squeeze ratio S1/S2 of the squeezing flow path is set to satisfy the following relationship to generate an extensional flow in the kneaded compound flowing in the squeezing flow path: squeeze ratio S1/S2 of the squeezing flow path=25 to 180 where S1: flow path cross-sectional area of the polymer flow duct and S2: sum total of flow path cross-sectional area of the squeezing flow path. Other background references include GB 1 386 143; EP 0 816 047 A; U.S. Patent Application Publication No. 2005/035051, U.S. Patent Application Publication No. 2010/022735, U.S. Patent Application Publication No. 2013/020247; and U.S. Pat. No. 4,453,905.

Despite past endeavors, there remains a need for a solution for preparing polyolefin resins that can produce articles such as films that have no or reduced levels of gels or the ability to produce a polymer composition that includes a polymer matrix having a dispersed phase of a second polymer or resin component and/or at least one additive.

SUMMARY

In a class of embodiments of the invention, the invention provides for a device for processing polymers comprising:
  a) an elongated body having a central axis;
  b) a plurality of inlet ducts parallel to the central axis;
  c) a plurality of outlet ducts parallel to the central axis; and
  d) a plurality of transition zones comprising one or more passages and one or more accelerations zones;
  e) wherein the one or more passages are not parallel to the central axis and provide fluid communication between at least one inlet duct and at least one outlet duct.

In another class of embodiments of the invention, the invention provides for a polymer processing system comprising:
 a) at least one extruder or mixer;
 b) at least one pelletizer;
 c) one or more of the device(s) as described above; and
 d) a screen changer;
wherein the device is nested in the screen changer.

In yet another class of embodiments of the invention, the invention provides for a process for processing one or more polymers, the process comprising:
 a) obtaining one or more polymers;
 b) extruding the one or more polymers through at least one extruder or mixer, optionally, with at least one gear pump, to form a molten material;
 c) passing the molten material through one or more of the device(s) of as described above; and
 d) optionally, pelletizing the molten material to obtain pellets or passing the molten material into a molding process, to form an article.

Other embodiments of the invention are described and claimed herein and are apparent by the following disclosure.

DETAILED DESCRIPTION

Figure 1:
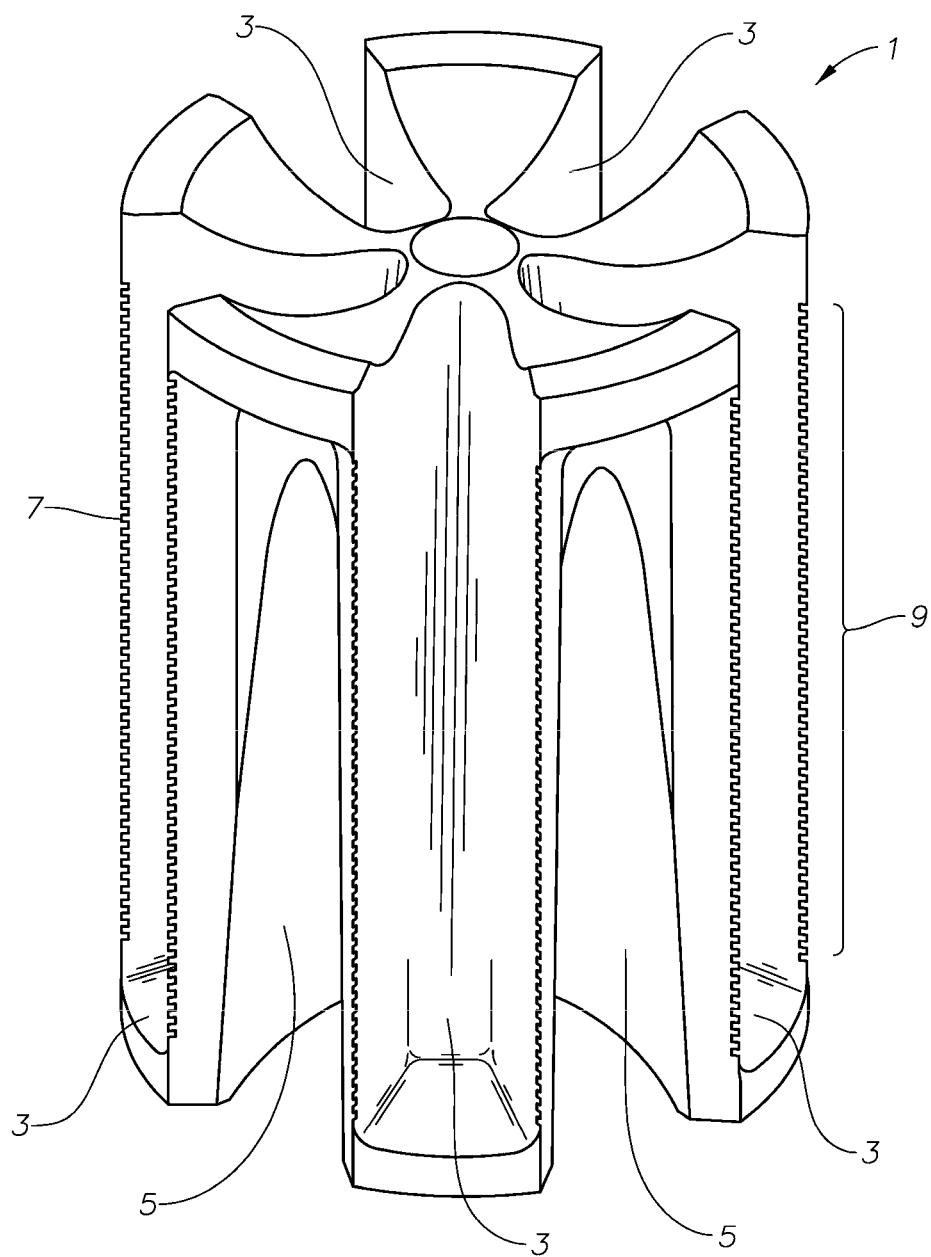
FIG. 1 provides a representation of the inventive device in one embodiment of the invention.

Before the present compounds, components, compositions, and/or methods are disclosed and described, it is to be understood that unless otherwise indicated this invention is not limited to specific compounds, components, compositions, reactants, reaction conditions, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a", "an" and "the" include plural referents unless otherwise specified.

Classes of embodiments of the invention are directed to a process for processing one or more polymers, for example, polymers or resins (for example, polyolefin polymers, elastomers, etc.), the process comprising: a) obtaining one or more polymers; b) extruding the one or more polymers through at least one extruder to form a molten material; and c) passing the molten material through one or more device (s). The device may comprise:
 a) an elongated body having a central axis;
 b) a plurality of inlet ducts parallel to the central axis;
 c) a plurality of outlet ducts parallel to the central axis; and
 d) a plurality of transition zones comprising one or more passages and one or more acceleration zones; wherein the one or more passages are not parallel to the central axis and provide fluid communication between at least one inlet duct and at least one outlet duct. The process may optionally include another step, step d), pelletizing the molten material to obtain pellets or passing the molten material into a molding process, to form an article, for example a film. One or more polymers may comprise polyolefin polymers, other polymers, elastomers, and mixtures thereof. In some embodiments, the polyolefin polymers may comprise polyethylene polymers, polypropylene polymers, or elastomers, or mixtures thereof (including homopolymers, copolymers, terpolymers, interpolymers, etc.). In an embodiment of the invention, a fluropolymer could be dispersed in a polyolefin matrix through the use of the device as described herein.

In several classes of embodiments of the invention, the inventive device accelerates the polymer in the one or more acceleration zones as referred to above and secondary species or component, for example, gels or another secondary component, through a geometric opening of the plurality of transition zones specifically designed such that the polymer or secondary species cannot elongationally withstand the forces acting on it and disperses into smaller species, for example, smaller particles. Thus, the polymer or secondary specie is modified in the one or more acceleration zones of the plurality transition zones. As used herein, "secondary component" or "secondary specie(s)" refers to any material present in a minority amount in another material. Ideally, this is accomplished via a geometric design of the device that is capable of creating these acceleration zones at a minimal increase in pressure drop when compared to conventional screen technology, for example, a standard screen, typically, 20-80 mesh screens, used for commercial processing. In a class of embodiments of the invention, the process is directed at reducing the size or changing the domain size of the gels in the polymer molten material or providing better dispersion of the gels/secondary specie in the polymer molten material. In particular, the molten material entering the device comprises gels and the average gel size is reduced or the domain size changes after passing the molten material through the device. For example, if one large gel is dispersed into 1000 very small gels, the total defect area might actually increase but the very small sizes might be invisible to the naked eye. Thus, the secondary component, for example, the smaller gels, will typically still remain but in much smaller domain sizes. For example, the average gel size of the secondary component is reduced by at least 10% after passing the molten material through the device, alternatively, by at least 15% after passing the molten material through the device, alternatively, by at least 30% after passing the molten material through the device, and alternatively, by at least 45% after passing the molten material through the device. In contrast, conventional screen technology attempts to filter gels, secondary components, etc. without be able to accelerate the particle to change its domain size after exiting the acceleration zones of the transition zones of the inventive devices. Such an approach results, in among other things, pressure drop disadvantages that requires more equipment, increases energy costs, and/or slows the rates at which one is able to process material.

In another class of embodiments of the invention, the process is directed at dispersing one or more secondary materials or components in a polymer matrix. In particular, in these embodiments, one or more different polymers, optionally, with one or more additives, form a polymer composition comprising a polymer matrix having a dispersed phase including a second polymer component, third polymer component, etc. and/or one or more additives. The polymer composition having a polymer matrix and dispersed phase may be produced by passing the molten material through the device to produce the polymer composition. For example, the molten material may comprise a polyolefin polymer, such as a polyethylene polymer or polypropylene polymer, and secondary polymer component, such as a different polymer or a cured rubber typically in the form of pieces or particles. The molten material, optionally, with one or more additives, may be passed through the device as described herein to form a polymer matrix of the polyolefin polymer and the secondary polymer component and/or the additives form the dispersed phase in the matrix.

In several classes of embodiments of the invention, the device described above may have one or more of the following features:

a) the plurality of inlet ducts and the plurality of outlet ducts may be arranged around the central axis;
b) the plurality of inlet ducts and the plurality of outlet ducts may be concentrically arranged in a circle around the central axis;
c) the plurality of inlet ducts and the plurality of outlet ducts may alternate around the central axis;
d) the one or more passages may be substantially transverse to the central axis, or, alternatively; wherein the one or more passages are situated at an angle to the central axis;
e) the one or more passages may comprise a series of projections, the projections may be substantially uniform in shape, quadrilateral in shape, or rectangular in shape and may be placed equidistant from each other in the one or more passages, the projections may range from several microns in diameter to one or more millimeters in diameter;
f) the device may be made from, at least partially, iron, steel, stainless steel, steel alloy, or mixtures thereof, alternatively, the device may be made from, at least partially, from any material capable of meeting the pressure requirements of the processing system, for example, high density plastics or composite or nano materials;
g) the device may be made from, at least partially, a polished metal; and
h) the device may be made from, at least partially, a coated metal or other material.

In a specific embodiment of the invention, with reference to FIG. 1, as an illustrative example, the device (1) may have at least five inlet ducts (3) and at least five outlet ducts (5) (not all ducts are shown and labeled in the figure). The number of inlet and outlet ducts is not critical. The device may have any number of inlet and outlet ducts. It is important to meet the minimum pressure drop so excessive division of the flow does not impede optimum flow geometry. Ideally, the ducts may be machined, polished, coated, texturized, etched, etc. to minimize the pressure drop loss as the polymer material passes through the device. The device is most cost-effective if it is designed to fit into conventional equipment. The device may be contained within a metal holder, for example, a screen changer, or nested in a sleeve that forces the polymer material through the device and requires the polymer material to accelerate through the one or more passages (7) and one or more acceleration zones (not shown or numbered) of the plurality of transition zones (9). The metal holder may be made out of the same or different material as the device. The one or more passages (7) and one or more acceleration zones should be designed and tailored to match the rheological behavior of the polymer material to create acceleration and provide for minimal losses in pressure drop. For example, embodiments of the device of the invention use rheological extensional and elongational behavior/forces such that the secondary component cannot sustain the flow environment in its inlet form.

Since the device(s) are intended for use in commercial extrusion lines, minimization of pressure drop throughout the device(s) is critical. Ideally, implementation of the inventive device should not exceed the pressure rating of the discharge system components, should not be economically rate-limiting, and should not foul quickly, thus, requiring frequent line outage for change-out. Thus, the device(s) should be geometrically designed to minimize pressure drop while maximizing extensional forces on the gel or secondary component, for example, secondary polymer component and/or one or more additives. This is at least one advantage over using conventional screens as filters. For example, a primary goal of filtration is the removal of undesirable components in a polymer material. However, due to the inherent nature of the use of screens, the extrusion process will inevitably suffer from a pressure drop. For example, pressure is required to enable the flow of a liquid past an obstruction, i.e., the filter. The more restrictive the obstruction, the more pressure is required to force the flow of the material through the obstruction. This pressure drop is limiting to production rates and energy efficiency when using conventional screen technology. Thus, it is desirable to generate minimum pressure drop in the extrusion process so as to not become rate-limiting or exceeding the allowable operating pressure of the polymer processing system. Additionally, in order to get equivalent rheological forces on the polymer and secondary species, acceleration through the device needs to be controlled. In comparison, conventional screen technology cannot achieve such control without getting excessively restrictive on polymer flow.

In contrast, processes employing the device(s) disclosed herein do not attempt to remove gels or the secondary component but they alter or modify the gels or secondary component to allow them to pass through the polymer processing system in modified form to produce a desirable product. Thus, in several classes of embodiments, this approach offers advantages over the use of conventional screens in filtration by mitigating the problems associated with pressure drop.

For commercial applications, it is envisioned that more than one device may be applied per processing line. The number of devices may be set by the flow, how small an opening is required for the elongational effect, and how many openings are needed to achieve the effect without excessive pressure drop, etc. Pressure drop is affected by the flow through the hole so the higher the flow and the more restrictive the element, the more openings are needed to keep the flow per opening low. In a class of embodiments, multiple devices are designed to fit into a single screen changer arrangement that is used with commercial extruders available from several extrusion equipment suppliers. The screen holders and screens are removed and replaced with the devices described herein due to element fouling approaches and allowable pressure limits.

Figure 2:
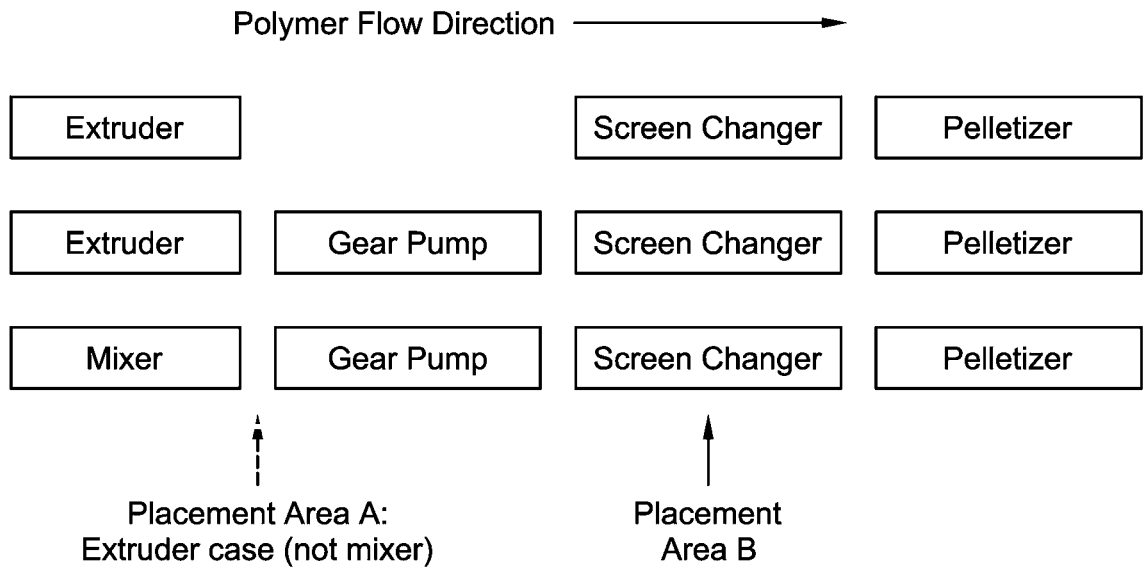
FIG. 2 provides a schematic representation of where inventive devices may be implemented in an overall polymer processing system.

For example, FIG. 2 follows the polymer flow direction in a typical, commercial polymer processing system or line. As can be seen in FIG. 2, Placement Area A or Placement Area B are two locations where the one or more inventive devices may be incorporated into a commercial line. Placement Area B illustrates how the screen changer could be modified with little effort to incorporate the device or devices into a commercial line. In particular, some extrusion trains or mixer trains use gear pumps located between the extruder (or mixer) and the pelletizer. Inventive devices as described herein may be used either before and/or after the gear pump in an extruder system but it is preferably placed between the gear pump and pelletizer for a mixer system as mixers do not generate enough discharge pressure to allow for pressure-consuming devices.

For these applications, it is expected that since the outer device holders are of solid construction, there is a potential for polymer flow dead zones that could encourage polymer hold-up and degradation. As such, the devices may be arranged physically within the dimensions of the screen changer slide plate, as opposed to the standard extension of the screen holders from the screen changer breaker/slide plate. This facilitates use of multiple devices without redesign of the standard screen changer. Accordingly, this arrangement should provide for use with equipment currently commercially available with little to no modification of the commercial equipment.

Additionally, not all polymer grades processed on an extrusion line needs to be subjected to the extensional forces of the device. Therefore, in several embodiments, the one or more devices may be configured to be retracted from the polymer processing system without significant downtime between grades benefiting from the device versus those that do not require it.

In yet another class of embodiments of the invention, the invention provides for a polymer processing system comprising: a) at least one extruder or mixer; b) at least one pelletizer; c) one or more of the device(s) as described above; and d) a sleeve; wherein the device is nested in the sleeve. In some embodiment of the inventions, the one or more passages of the device comprise a series of projections and the projections are flush with the wall of the sleeve. The system may be configured to process polymer first, in the extruder, second, in the device, and then to the pelletizer; wherein the system comprises a plurality of polymer molecular species and substantially all of the polymer molecular species pass through the system to the pelletizer. As used herein, "substantially all" refers to 60% or greater in some embodiments, alternatively, 75% or greater, alternatively, 80% or greater, alternatively, 90% or greater, alternatively, 95% or greater, and alternatively, 99% or greater.

General Polymer Processing

However, before the molten material may be passed through the device(s) as described above, the polymer or resin material typically is heated to at least its melting point, usually, by being passed through an extruder or mixer. It should be noted that although the polymer matrix material is heated to its melting point or to some greater temperature, other components present in the matrix may or may not be molten. In particular, the process generally includes melt blending a polymer composition through an extruder or mixer, extruding the polymer composition through a die, and then cooling the polymer composition or passing the molten material directly to downstream processes that form articles, such as films. (See, for example, U.S. Pat. Nos. 4,814,135, 5,076,988, 5,153,382, 5,728,335, and U.S. Patent Application Publication No. 2005/0012235).

Typically, polymer granules are melted via the main drive energy input and the work imparted via extruder screws or mixer rotors. The polyolefin may be further blended, and is ideally blended as well as melted in a sequential or simultaneous process in the same instrument. The melting, blending or "melt blending" may take place with extruders (or mixers) and processes for extrusion as listed in the references above. For example, one can use extruders, either twin-screw type, for example, a Coperion ZSK co-rotating twin-screw extruder, or a single-screw extruder (such as those available from Japan Steel Works, Farrel Corporation, Berstorff, etc.)

For some applications, the screw portion of the single-screw extruder may be divided up into three sections: the feed section, the compression section, and the metering section. It may have multiple heating zones from the rear heating zone to the front heating zone, the multiple sections and zones running from upstream to downstream. If the extruder has more than one barrel, the barrels ideally may be connected in series. The length to diameter ratio of each barrel may be in the range of 16:1 to 40:1. Blending of the polymer may also be accomplished, for example, in a batch type mixer such as a BANBURY™ or a BRABENDER™ mixer. Tangential and intermeshing counter-rotating and intermeshing co-rotating mixers, two stage mixers, and multistage long length/diameter mixers may also be used. (See, for example, U.S. Pat. Nos. 4,334,783 and 5,458,474). The blending may take place at temperatures in the range from 160 to 270° C., in particular, carried out at temperatures in the range from 180 to 240° C.

The blending step is followed by passing the molten polymer material through one more devices. As discussed above, the one or more passages of the transition zones of the device may be specially designed to separate, reduce the size and/or disperse the secondary component. Ideally, the rheological behavior of the gel, for example, the specific molecular and extensional flow behavior of the gel, must be matched with the geometry of the one or more passages of the transition zones of the device such that the gel is subjected to extensional flow forces that breaks up the gels into smaller particles such that an optical gel counter cannot detect or at least reduces the size of the gels to produce a desirable product. Further quality control analysis may occur to assess product quality, for example, using an OCS gel counter to assess film quality off-line. It is believed that as the polymer material containing gels passes through the one or more passages of the transition zones of the device, it undergoes a significant acceleration in velocity, extensional forces are generated that the gels cannot withstand, and separates or disperses the gel into smaller particles. The flow may be simulated using FLUENT™ polymer flow software to calculate flow, pressure drop, etc. Although this phenomena is applicable to gel separation or dispersion, it is believed to be equally applicable to dispersing any secondary component such as a secondary polymer component, for example, a different polymer or a cured rubber particle, and/or one or more additives.

In some embodiments of the invention, this step may be also accompanied by passing the molten polymer material through at least one screen, which may be housed in a breaker plate. It will be understood that the term "screen(s)" includes screens, sieves, and other filter media. The active screens can be, for example, square weave wire screens and Dutch weave wire screens. The screens may have closely spaced square openings, triangular openings, or round openings, regular or irregular in shape. The use of screens is well known and exemplary descriptions of various screens and their use may be found in U.S. Pat. Nos. 5,730,885, 6,485, 662; and U.S. Patent Application Publication No. 2007/0100132, issued as U.S. Pat. No. 7,393,916. In some embodiments, it may be useful to pre-screen the polymer stream for large debris prior to contact with the device to help diminish the chance for device fouling. In such embodiments, an upstream or inlet screen may be applied.

Polymers and Additives

In some embodiments of the invention, the polymers to be processed are one or more of the same or different polymers or resins, elastomers, and mixtures thereof. The polyolefin polymers may comprise polyethylene polymers, polypropylene polymers, or mixtures thereof (including homopolymers, copolymers, terpolymers, interpolmers, etc.). The polyolefin polymer may be any polymer comprising at least 40 to 100% by weight of olefin derived units, preferably α-olefin derived units. Most preferably, the olefin derived units comprise ethylene and/or propylene and other α-olefins selected from the group consisting of $C_3$ to $C_{12}$ α-olefins, including, linear, cyclic and substituted olefins.

In some embodiments of the invention, a polyethylene resin can be a polyethylene homopolymer or copolymer of ethylene and one or more $C_3$-$C_{20}$ alpha-olefin comonomers. As used herein, the term "ethylene copolymer" indicates a polymer formed of more than 50 wt % polymerized ethylene units, and the remaining less than 50 wt % polymerized units being polymerized α-olefin comonomers, such as $C_3$-$C_{20}$ α-olefins, more particularly, $C_3$-$C_{12}$ α-olefins, such as butene and/or hexene. Other suitable α-olefin comonomers may be linear or branched, and two or more comonomers may be used, if desired. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

Additionally, for bimodal polymer compositions, the devices described herein may be very useful. For example, one of the disadvantages of bimodal polymer compositions can be the formation of two distinctly separate polymer species where the secondary component is not properly dispersed in the bimodal polymer composition. Under such circumstances, the two distinct species without proper dispersion can negatively impact processing or ultimate product properties if not dispersed properly. For these applications, the one or more devices described herein may be very useful in dispersing the secondary component in the bimodal polymer composition so as to mitigate the problems described above.

The polymer material may also be blended with certain additives. Conventional additives that may be introduced include without limitation antioxidants, ultraviolet absorbers, antistatic agents, pigments, dyes, nucleating agents, fillers, slip agents, fire retardants, plasticizers (for example, polyalphaolefins, phthalates, benzoates, adipates, cyclohexanoates, etc.), processing aids, lubricants, stabilizers, smoke inhibitors, viscosity control agents, crosslinking agents, catalysts, boosters, tackifiers, anti-blocking agents, and any combination thereof.

In one embodiment, an oxidizing agent is also added during the melting step as a reactive component with the polymer. In this embodiment, the polymer stream is extruded with an oxidizing agent, preferably, an oxygen-containing gas, such as air. After subjecting the polymer stream to the oxidation reaction, it may be passed through one or more of the devices described herein to disperse the modified polymeric species in the matrix.

End Use Applications

The polymer material may be further processed to form a film. The films may be cast films or blown films. The films may be further embossed or processed according to other known film finishing processes. The films may be tailored to specific applications by adjusting the thickness, materials, and order/type of the various layers, as well as the additives in each layer. The films may be monolayer or multilayer films. Further, films may be used in any typical film application, such as stretch films, shrink films, packaging films, bags, geo membranes, liners, and other film applications known in the art.

The polymer material may be processed, with or without additives as described above, by any suitable means for forming films: film blowing or casting and all methods of film formation to achieve, for example, uniaxial or biaxial orientation.

Any extruder suitable for extrusion of polymer material operating under any desirable conditions may be used to produce the films. Extruders and processes for extrusion are described in, for example, U.S. Pat. No. 4,169,67. Examples of various extruders, that may be used in forming the film are a single screw type such as one modified with a blown film die and air ring and continuous take off equipment, a blown film extruder, and a slot cast extruder. Twin screw extruders may also be used. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections: the feed section, the compression section, and the metering section. It may have multiple heating zones from the rear heating zone to the front heating zone, the multiple sections and zones running from upstream to downstream.

If it has more than one barrel, the barrels are typically connected in series. Twin-screw extruders are typically comprised of multiple barrels connected in series typically forming an overall L/D ratio of 8:1 up to 36:1. Shorter or longer L/D ratios are possible and are dependent on the processing action required in the extruder. Single-screw extruders can be comprised of one or more barrels likewise dependent upon the processing requirement. The extrusion typically takes place at temperatures in the range from 180 to 300° C. but is dependent on the polymer being processed and the operating conditions of the machine. The range of application of the device can vary from a smaller compounding extruder line (typically 25-170 mm in screw diameter) up to major commercial compounding lines in the 240-420 mm screw diameter sizes.

In one embodiment, a grooved feed extruder may used. The extruder may possess a L/D ratio of from 80:1 to 2:1 in one embodiment, alternatively, from 60:1 to 6:1 in another embodiment, alternatively, from 40:1 to 12:1 in yet another embodiment, and alternatively from 30:1 to 16:1 in yet another embodiment.

A mono or multi-layer die may be used. In one embodiment, a 50 to 200 mm monolayer die may be used, alternatively, a 90 to 160 mm monolayer die in another embodiment, and alternatively, a 100 to 140 mm monolayer die in yet another embodiment. The die may have a nominal die gap ranging from 0.6 to 3 mm in one embodiment, alternatively, from 0.8 to 2 mm in another embodiment, and alternatively, from 1 to 1.8 mm in yet another embodiment, wherein a desirable die may be described by any combination of any embodiment described herein.

In a class of embodiments of the invention, the polymer material may be processed to form a cast film. Processes to form cast films are well-known. For example, a polymer material may be extruded in a molten state through a flat die and then cooled to form a film. As an example, cast films may be prepared using a pilot scale commercial cast film line machine as follows. Pellets of the polymer material are melted at a temperature ranging from 250° C. to 300° C., with the specific melt temperature typically being chosen to match the melt viscosity of the particular polymer. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The polymer material is then drawn down to the final gauge. The material draw down ratio is typically about 21:1 for 0.8 mil (20 μm) films. A vacuum box or air knife may be used to pin the melt exiting the die opening to a primary chill roll maintained at about 90° F. (32° C.). The resulting polymer film is collected on a winder. The film thickness may be monitored by a gauge monitor, and the film may be edge trimmed by a trimmer. One or more optional treaters may be used to surface treat the film, if desired. Such chill roll casting processes and apparatus are well known in the art. Although chill roll casting is one example, other forms of casting may be used.

In another class of embodiments of the invention, the polymer material may be processed to form a blown film. Processes to form blown films are well-known. For example, the polymer material may be extruded in a molten state through an annular die and then blown and cooled to form a tubular, blown film, which can then be axially slit and unfolded to form a flat film. As an example, blown films may be prepared as follows. The polymer material is conveyed to an extruder, such as a 63.5 mm Egan extruder that is water-cooled, resistance heated, and has an L/D ratio of 24:1. The film may be produced using a 15.24 cm Sano die with a 2.24 mm die gap, along with a Sano dual orifice non-rotating, non-adjustable air ring. The film is extruded through the die into a film that was cooled by blowing air onto the surface of the film. The film is drawn from the die typically forming a cylindrical film that is cooled, collapsed, and optionally subjected to a desired auxiliary process, such as slitting, treating, sealing, or printing. The finished film may be wound into rolls for later processing or can be fed, for example, into a bag machine and converted into bags or other articles. Of course, other blown film forming methods may also be used.

In other embodiments, the polymer material may be further processed by injection molding to form an injection-molded article. Methods of injection molding are well-known in the art.

In yet other embodiments, the polymer material may be further processed by blow molding to form a blow-molded article. Methods of blow molding are well-known in the art.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

The device as described in FIG. 1 was fabricated and tested using resin (available from ExxonMobil Chemical, Houston, Tex.) on a standard ZSK-70 twin-screw extruder processing line, fitted with a metal holder. The polymer tested was metallocene-based polyethylene resin characterized by a 0.5 dg/10 min melt index (ASTM D1238) and 0.916 g/cc gradient density. The polymer tested contained >1000 ppm of polymeric gels in the 1-1500 microns in size, the majority being in the 100-600 micron range.

Extrusion polymer rates, machine RPM, and processing conditions were selected to represent scaled-down commercial extrusion conditions.

Three (3) processing conditions were evaluated: (1) processing through a standard 20-mesh screen device, (2) processing through a composite screen using 100-mesh/200-mesh Dutch-weave/100-mesh screen composite, and (3) an embodiment of the inventive device as shown in FIG. 1. Product processed per these three processing arrangements were then tested on a cast film line equipped with an Optical Counting System (OCS) capable of measuring film defect area and counting film defects by size. The OCS has been described in U.S. Pat. No. 7,393,916, col. 12.

The extrusion rate was varied between 250-400 kg/hr to evaluate the potential effect of rate on gel size reduction and pressure drop performance. The results are shown in the FIG. 3 and Table 1.

Figure 3:
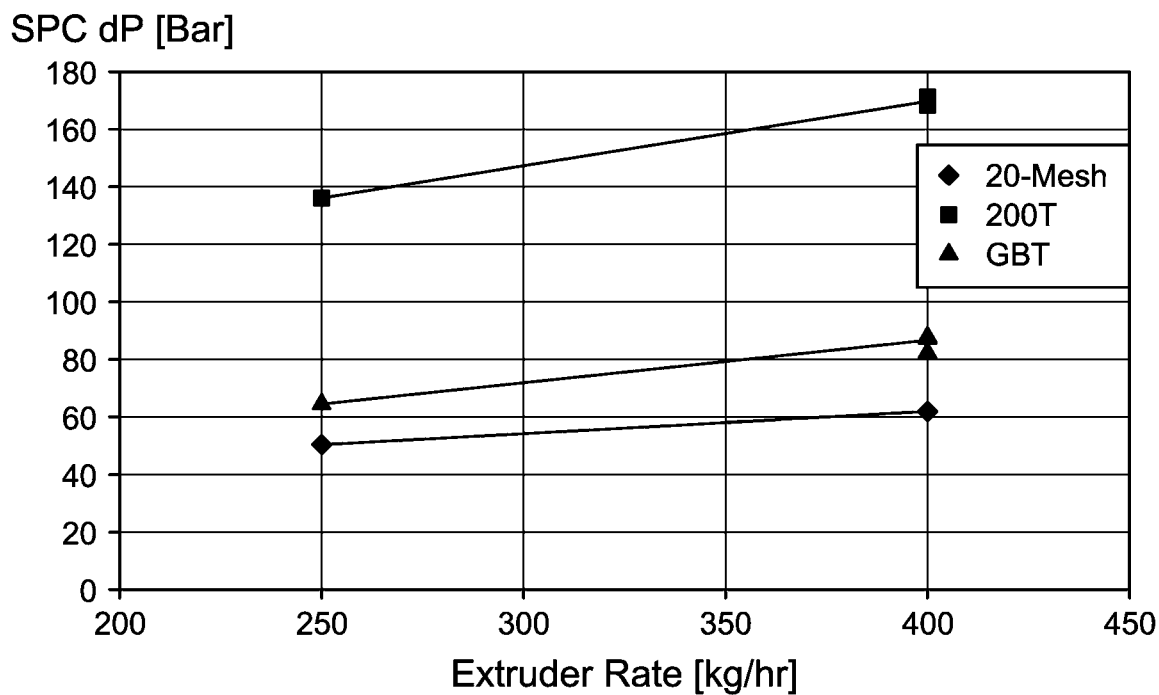
FIG. 3 provides a graph showing the pressure drop performance of the examples.

With reference to FIG. 3, as can be seen, the example evaluated the effectiveness of an embodiment of the inventive device (3) against 20-mesh screens (1) and multi-layer Dutch-weave screens (2) for both gel size reduction and pressure drop generation. The "200T" data represents Condition 2 and the use of the composite 200-mesh Dutch Weave screens. The GBT curve represents the Condition 3 performance using an embodiment of the inventive device.

As discussed previously, the large increase in pressure drop for the restrictive screens used in Condition 2 confirms the theoretical prediction and the significant operating cost penalty for commercial application. Condition 3/GBT (inventive device) exhibits only a minor increase in pressure drop versus a standard 20-mesh screen.

Commercial film applications might typically count the gels per OCS methods and include all species detected over the size of 200-300 microns. For this evaluation, cast film-generated films were measured via OCS for gel count and compared for gel counts ≥300 microns in size.

The performance at the three conditions are summarized in Table 1.

TABLE 1

| 300 μm Gel Count at Different Extruder Rates | 250 kg/hr | 400 kg/hr |
|---|---|---|
| 20-Mesh Screens (reference)* | base case | base case |
| 200T Screens | 0% gel reduction | 25% gel reduction |
| GBT Device | 10-15% gel reduction | 10-15% gel reduction |

*Both 200T Screens and the GBT Device are in comparison to 20-Mesh Screens (reference).

The extrusion processing conditions were then changed to operate at higher specific energy (KWh/kg) in combination with the GBT inventive device causing the gel count to be further reduced from −15% to −45% in count (gels≥300 μ).

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A device for processing polymers comprising:
   an elongated body having a central axis running through a central core;
   a plurality of inlet ducts parallel to the central axis;
   a plurality of outlet ducts parallel to the central axis; and
   a plurality of transition zones comprising one or more passages and one or more accelerations zones, wherein each transition zone provides fluid communication between at least one inlet duct and at least one outlet duct, wherein each inlet duct is open at a first end of the elongated body, and wherein the central core of the elongated body at the first end of the elongated body is solid.

2. The device of claim 1, wherein the plurality of inlet ducts and the plurality of outlet ducts are arranged around the central axis.

3. The device of claim 1, wherein the plurality of inlet ducts and the plurality of outlet ducts are concentrically arranged in a circle around the central axis.

4. The device of claim 1, wherein the plurality of inlet ducts and the plurality of outlet ducts alternate around the central axis.

5. The device of claim 1, wherein each of the one or more passages is substantially transverse to the central axis.

6. The device of claim 1, wherein each of the one or more passages is situated at an angle to the central axis.

7. The device of claim 1, wherein each of the one or more passages comprise a series of projections.

8. The device of claim 7, wherein the projections are substantially uniform in shape.

9. The device of claim 7, wherein the projections are quadrilateral in shape.

10. The device of claim 1, wherein the device is made from, at least partially, iron, steel, stainless steel, steel alloy, or mixtures thereof.

11. The device of claim 1, wherein the device is made from, at least partially, a polished metal or a coated metal.

12. A polymer processing system comprising:
    at least one extruder or mixer;
    at least one pelletizer;
    the device of claim 1; and
    a screen changer, wherein the device is nested in the screen changer.

13. The polymer processing system of claim 12, wherein the one or more passages of the device comprise a series of projections and the projections are flush with a wall of the screen changer such that each transition zone is partially defined by the wall of the screen changer.

14. The polymer processing system of claim 12, wherein the system is configured to process a polymer first in the at least one extruder or mixer, second in the device of claim 1 nested in the screen changer, and third in the at least one pelletizer, wherein the polymer comprises a plurality of polymer molecular species and substantially all of the plurality of polymer molecular species pass into the pelletizer.

15. The polymer processing system of claim 12, wherein each transition zone is partially defined by an inner surface of the screen changer.

16. A process for processing one or more polymers, the process comprising:
    extruding the one or more polymers through at least one extruder or mixer to form a molten material; and
    passing the molten material through the device of claim 1, wherein the device of claim 1 is nested in a metal holder.

17. The process of claim 16, wherein the molten material entering the device of claim 1 comprises gels and the average gel size is reduced by at least 30% after passing the molten material through the device of claim 1.

18. The process of claim 16, wherein each transition zone is partially defined by an inner surface of the metal holder.

19. The device of claim 1, wherein the device is configured to be nested in a metal holder such that each transition zone is partially defined by an inner surface of the metal holder when the device is nested in the metal holder.

20. A polymer processing apparatus, comprising:
    a metal holder; and
    a device nested in the metal holder, the device comprising:
        an elongated body having a central axis;
        a plurality of inlet ducts parallel to the central axis;
        a plurality of outlet ducts parallel to the central axis; and
        a plurality of transition zones comprising one or more passages and one or more acceleration zones, wherein each transition zone provides fluid communication between at least one inlet duct and at least one outlet duct, and wherein each transition zone is partially defined by an inner surface of the metal holder.

21. The polymer processing apparatus of claim 20, wherein the metal holder is a screen changer.

22. The polymer processing apparatus of claim 20, wherein each inlet duct is open at a first end of the elongated body, and wherein a central core of the elongated body at the first end of the elongated body is solid.

23. A device for processing polymers, comprising:
    an elongated body comprising a solid central core at a first end thereof, the solid central core having a central axis extending therethrough;
    a plurality of inlet ducts parallel to the central axis, wherein each inlet duct is open at the first end of the elongated body;
    a plurality of outlet ducts parallel to the central axis; and
    a plurality of transition zones comprising one or more passages and one or more acceleration zones, wherein a flow path through each transition zone provides fluid communication between at least one inlet duct and at least one outlet duct.

24. The device of claim 23, wherein the device is configured to be nested in a metal holder such that each transition zone is partially defined by an inner surface of the metal holder.

25. The device of claim 24, wherein the metal holder is a screen changer.

* * * * *